US010481795B2

(12) United States Patent
Mienkina et al.

(10) Patent No.: US 10,481,795 B2
(45) Date of Patent: Nov. 19, 2019

(54) HARDWARE INTERFACE COMPONENT FOR PROCESSING WRITE ACCESS REQUESTS THAT IDENTIFY A REGISTER USING LESSER SIGNIFICANT BITS OF A TARGET ADDRESS AND IDENTIFY AN ARITHMETIC OPERATION TO BE PERFORMED USING GREATER SIGNIFICANT BITS OF THE TARGET ADDRESS

(71) Applicants: Martin Mienkina, Bystrice Nad Olsi (CZ); Joseph Charles Circello, Phoenix, AZ (US); Wangsheng Mei, Suzhou (CN); Yan Xiao, Suzhou (CN)

(72) Inventors: Martin Mienkina, Bystrice Nad Olsi (CZ); Joseph Charles Circello, Phoenix, AZ (US); Wangsheng Mei, Suzhou (CN); Yan Xiao, Suzhou (CN)

(73) Assignee: NXP USA, Inc., Austin, TX (US)

( * ) Notice: Subject to any disclaimer, the term of this patent is extended or adjusted under 35 U.S.C. 154(b) by 140 days.

(21) Appl. No.: 14/708,969

(22) Filed: May 11, 2015

(65) Prior Publication Data
US 2016/0231937 A1    Aug. 11, 2016

(30) Foreign Application Priority Data

Feb. 10, 2015    (CN) .......................... 2015 1 0069258

(51) Int. Cl.
*G06F 3/06* (2006.01)
*G06F 9/38* (2018.01)
(Continued)

(52) U.S. Cl.
CPC .......... *G06F 3/0604* (2013.01); *G06F 3/0629* (2013.01); *G06F 3/0673* (2013.01);
(Continued)

(58) Field of Classification Search
CPC .... G06F 3/0604; G06F 9/3877; G06F 12/063; G06F 3/0629; G06F 3/0673; G06F 13/4068; G06F 13/16
(Continued)

(56) References Cited

U.S. PATENT DOCUMENTS 5,420,989 A    5/1995  Maher, III et al.
5,974,539 A *  10/1999 Guttag ................ G06F 9/30167
                                                      708/236
(Continued)

FOREIGN PATENT DOCUMENTS

EP         1282035 A1    2/2003

OTHER PUBLICATIONS

Texas Instruments, "Chapter 25: 32-Bit Hardware Multiplier (MPY32)," MSP430x5xx and MSP430x6xx Family User's Guide, Literature No. SLAU208M; Jun. 2008—Revised Feb. 2013; 19 pages.
(Continued)

*Primary Examiner* — Benjamin P Geib
*Assistant Examiner* — Shawn Doman

(57) ABSTRACT

A hardware interface component arranged to operably couple at least one arithmetic unit to a an interconnect component of a processing system. The hardware interface component comprises a plurality of program-visible registers and at least one operation decoder component. The at least one operation decoder component is arranged to, upon receipt of a write access request via the interconnect component corresponding to a decorated memory-mapped address range for the hardware interface component, decode a register identifier component of a target address of the received write access request to identify at least one of the program-visible registers, decode a decoration component of the target address of the received write access request to identify an arithmetic operation to be performed, and con-
(Continued)

figure the arithmetic unit to perform the identified arithmetic operation on at least one input operand within the identified at least one program-visible register.

16 Claims, 6 Drawing Sheets

(51) Int. Cl.
    *G06F 9/30*     (2018.01)
    *G06F 12/06*     (2006.01)
    *G06F 13/16*     (2006.01)
    *G06F 13/40*     (2006.01)

(52) U.S. Cl.
    CPC .......... *G06F 9/3001* (2013.01); *G06F 9/3004* (2013.01); *G06F 9/3879* (2013.01); *G06F 9/3881* (2013.01); *G06F 12/063* (2013.01); *G06F 13/16* (2013.01); *G06F 13/4068* (2013.01)

(58) Field of Classification Search
    USPC ........................................................ 712/208
    See application file for complete search history.

(56) References Cited

U.S. PATENT DOCUMENTS

| | | | |
|---|---|---|---|
| 7,805,590 B2 | 9/2010 | Moyer et al. | |
| 2010/0106872 A1* | 4/2010 | Moyer | G06F 9/3004 710/100 |
| 2010/0318752 A1* | 12/2010 | Schwarz | G06F 12/0292 711/154 |
| 2016/0077834 A1* | 3/2016 | de Perthuis | G06F 9/322 712/201 |

OTHER PUBLICATIONS

Extended European Search Report for Patent Appln. No. 15199223.7 (dated Aug. 9, 2016).

William F Gilreath et al: "Computer Architecture: A Minimal Perspective" In: "Computer Architecture: A Minimal Perspective", Jan. 1, 2003 (Jan. 1, 2003), Springer, New York, XP055292409, ISBN: 978-1-4020-7416-5, pp. 42-43.

* cited by examiner

| Decorated Operation Code | | | | | | | | | | Register Name | Operation Offset Address[11:0] | Operation Mnemonic | Operation Brief Description |
|---|---|---|---|---|---|---|---|---|---|---|---|---|---|
| \| Address[11:2] \| \| \| \| \| \| \| Register Address[4:2] \| \| \| | | | | | | | | | | | | | |
| 11 | 10 | 9 | 8 | 7 | 6 | 5 | 4 | 3 | 2 | | | | |
| - | 0 | 1 | 0 | 1 | 1 | 0 | 0 | 0 | 0 | X0 | 0x2C0 (not used) | | |
| - | 0 | 1 | 0 | 1 | 1 | 0 | 0 | 0 | 1 | X1 | 0x2C4 (not used) | | |
| - | 0 | 1 | 0 | 1 | 1 | 0 | 0 | 1 | 0 | X2 | 0x2C8 (LSW of radicand) | 32=√64 | A10=√X32 |
| - | 0 | 1 | 0 | 1 | 1 | 0 | 0 | 1 | 1 | X3 | 0x2CC (MSW of radicand) | | |
| - | 0 | 1 | 0 | 1 | 1 | 0 | 1 | 0 | 0 | A0 | 0x2D0 (LSW of square root) | | |
| - | 0 | 1 | 0 | 1 | 1 | 0 | 1 | 0 | 1 | A1 | 0x2D4 (MSW of square root) | | |
| ... | | | | | | | | | | | | | |
| - | 1 | 0 | 0 | 0 | 1 | 0 | 0 | 0 | 0 | X0 | 0x440 (not used) | | |
| - | 1 | 0 | 0 | 0 | 1 | 0 | 0 | 0 | 1 | X1 | 0x444 (multiplicand) | | |
| - | 1 | 0 | 0 | 0 | 1 | 0 | 0 | 1 | 0 | X2 | 0x448 (LSW of multiplier) | 64=32*64 | A10=X1*X32 |
| - | 1 | 0 | 0 | 0 | 1 | 0 | 0 | 1 | 1 | X3 | 0x44C (MSW of multiplier) | | |
| - | 1 | 0 | 0 | 0 | 1 | 0 | 1 | 0 | 0 | A0 | 0x450 (LSW of product) | | |
| - | 1 | 0 | 0 | 0 | 1 | 0 | 1 | 0 | 1 | A1 | 0x454 (MSW of product) | | |
| ... | | | | | | | | | | | | | |
| - | 1 | 1 | 1 | 1 | 0 | 0 | 0 | 0 | 0 | X0 | 0x780 (LSW of numerator) | | |
| - | 1 | 1 | 1 | 1 | 0 | 0 | 0 | 0 | 1 | X1 | 0x784 (MSW of numerator) | | |
| - | 1 | 1 | 1 | 1 | 0 | 0 | 0 | 1 | 0 | X2 | 0x788 (LSW of denominator) | 64=64/64 | A10=X10/X32 |
| - | 1 | 1 | 1 | 1 | 0 | 0 | 0 | 1 | 1 | X3 | 0x78C (MSW of denominator) | | |
| - | 1 | 1 | 1 | 1 | 0 | 0 | 1 | 0 | 0 | A0 | 0x790 (LSW of quotient) | | |
| - | 1 | 1 | 1 | 1 | 0 | 0 | 1 | 0 | 1 | A1 | 0x794 (MSW of quotient) | | |

FIG. 6

HARDWARE INTERFACE COMPONENT FOR PROCESSING WRITE ACCESS REQUESTS THAT IDENTIFY A REGISTER USING LESSER SIGNIFICANT BITS OF A TARGET ADDRESS AND IDENTIFY AN ARITHMETIC OPERATION TO BE PERFORMED USING GREATER SIGNIFICANT BITS OF THE TARGET ADDRESS

CROSS-REFERENCE TO RELATED APPLICATION(S)

The present application claims priority to Chinese Patent Application No. 201510069258.1, entitled "HARDWARE INTERFACE COMPONENT AND METHOD THERE-FOR," filed on Feb. 10, 2015, the entirety of which is herein incorporated by reference.

FIELD OF THE INVENTION

This invention relates to a hardware interface component, and in particular to a hardware interface component arranged to operably couple at least one arithmetic unit to an interconnect component of a processing system.

BACKGROUND OF THE INVENTION

In deeply embedded application spaces such as power metering, hardware support for high-dynamic range arithmetic operations is important to maximize system performance and minimize device power dissipation. Conventional general purpose processing cores are optimized for general purpose applications, and often cannot support the required computational performance for many deeply embedded application spaces due to a lack of hardware support for high-dynamic range arithmetic operations such as 64-bit arithmetic operations like divide, square root, multiply and saturated fractional signal processing.

The leading microcontroller unit (MCU) providers have addressed the need for hardware support within embedded applications for such high-dynamic range arithmetic operations by either providing more advanced processing core architectures, for example the ARM™ Cortex™-M4 with an FPU (floating point unit) module, or by integration of a dedicated, memory-mapped arithmetic hardware unit with a more general purpose processing core. Whilst the more advanced processing core architectures may be suitable for high-end applications, their higher unit costs typically make them prohibitively expensive for lower-end applications. Accordingly, integration of a dedicated, memory-mapped arithmetic hardware unit with a general purpose processing core is required for providing hardware support within lower-end embedded applications within the specified size and power constraints.

Conventionally, a dedicated memory-mapped arithmetic unit connects to a microcontroller core through a hardware interface. The arithmetic unit is typically implemented as a hardwired logic circuit designed to calculate basic operations such as multiply, multiply-accumulate and multiply-subtract in a single clock cycle, and more advanced operations such divide and square-root in several clock cycles. While the performance of a stand-alone arithmetic unit for high-dynamic range calculations can provide a several-fold increase versus the most common microcontroller cores, the ability to take advantage of such computational performance of the arithmetic hardware unit is typically limited by the ability of the hardware interface to interface the arithmetic unit to the general purpose microcontroller core, and vice-versa.

FIG. 1 illustrates a conventional basic hardware interface implementation for the memory-mapped arithmetic hardware unit 110. The memory-mapped arithmetic unit 110 is shown as 32-bit design. Accordingly, the width of the programming model registers is 32 bits. For 64-bit arithmetic operations being accelerated, two 32-bit registers are concatenated together to form the required 64-bit data operand. By convention, the referenced 32-bit registers are named <REG>_H{igh} and <REG>_L{ow}.

The basic hardware interface 120 illustrated in FIG. 1 comprises input operand registers (OP1_L, OP1_H, OP2_L and OP2_H) into which input operands are written for 64-bit arithmetic operations to be performed by the arithmetic unit 110, a control register used to select and initiate operations, result registers (RES_L and RES_H) from which the results of the 64-bit arithmetic operations performed by the arithmetic unit 110 are read.

A 64=64/64 divide operation is used as an example of a 64-bit arithmetic operation to be performed by the arithmetic unit 110. For completeness, a 64=64/64 divide operation comprises 64-bit numerator being divided by a 64-bit denominator and the resulting 64-bit quotient calculated. The 64=64/64 programming model realized by the basic hardware interface 120 illustrated in FIG. 1 comprises the following memory-mapped 'accesses' for a 64=64/64 divide operation:

```
1.  ADDR(0x00) ← NUMERATOR_L// write least-significant 32 bits of numerator to
                               OP1_L
2.  ADDR(0x04) ← NUMERATOR_H   // write most-significant 32 bits of numerator
    to OP1_H
3.  ADDR(0x08) ← DENOMINATOR_L // write least-significant 32 bits of denominator
    to OP2_L
4.  ADDR(0x0C) ← DENOMINATOR_H // write most-significant 32 bits of
    denominator to                // OP2_H
5.  ADDR(0x10) ← CONTROL(0x01)    // write to control register to select & trigger
    operation
6.  QUOTIENT_L ← ADDR(0x14)    // read the least-significant 32 bits of result
    quotient                      // from RES_L
7.  QUOTIENT_H ← ADDR(0x18)    // read the most-significant 32 bits of result
    quotient                      // from RES_H
```

The basic hardware interface 120 is designed to perform one action with each access. The control register is provided to select the required operation and trigger its execution. For example, the control register may comprise a bit map for the supported operations, whereby each supported operation is identified by a single bit within the control register, as shown.

All of the operand, control and result registers are mapped continuously in the address space, which allows use of memory load and store multiple instructions using indirect addressing with automatic post incrementing of the address register. Use of such indirect addressing load and store multiple instructions increases computational throughput of the basic hardware interface 120. However, performing a single 64-bit arithmetic operation using the basic hardware interface 120 requires an additional access to be performed by writing to the control register for selecting and triggering the arithmetic unit to perform the required arithmetic operation.

It should be noted that programming model examples provided herein correspond to a "little endian" memory convention. However, it will be appreciated that other implementations can follow alternative memory conventions and organisations, for example, big endian.

FIG. 2 illustrates a known advanced hardware interface implementation for the memory-mapped arithmetic hardware unit 110. The advanced hardware interface 220 illustrated in FIG. 2 comprises a series of pairs of first input operand registers (OP1) into which input operands are written, a pair of second input operand registers (OP2) into which input operands are written and a pair of result registers (RES_L and RES_H) from which the results of the 64-bit arithmetic operations performed by the arithmetic unit 110 are read. The advanced hardware interface 220 uses a write to a first OP1 operand register pair to also select the operation to be performed by the arithmetic unit 110 and a write to the second OP2 operand register pair to initiate the operation.

A 64=64/64 divide operation is again used as an example of a 64-bit arithmetic operation to be performed by the arithmetic unit 110. The 64=64/64 programming model realized by the advanced hardware interface 220 illustrated in FIG. 2 comprises the following memory-mapped 'accesses':

```
1. ADDR(0x00) ← NUMERATOR_L// write least-significant 32 bits of numerator to
   OP1_L
                                // & select 64=64/64 operation
2. ADDR(0x04) ← NUMERATOR_H     // write most-significant 32 bits of numerator
   to OP1_H
3. ADDR(0x44) ← DENOMINATOR_L   // write least-significant 32 bits of denominator
   to OP2_L
4. ADDR(0x48) ← DENOMINATOR_H   // write most-significant 32 bits of
   denominator to
                                // OP2_H & trigger 64=64/64 operation
5. QUOTIENT_L ← ADDR(0x4C)      // read the least-significant 32 bits of result
   quotient                     // from RES_L
6. QUOTIENT_H ← ADDR(0x50)      // read the most-significant 32 bits of result
   quotient                     // from RES_H
```

The advanced hardware interface 220 is designed to perform multiple actions along with each particular access; operation type being selected based on the first input operand register address and triggered by the last write to the second operand. In this manner, the separate access to the control register required for the basic hardware interface 120 illustrated in FIG. 1 is not required, reducing the number of accesses required to be made to perform a single 64-bit arithmetic operation and retrieve the result to six.

However, the register mappings of the advanced hardware interface 220 by principle cannot be sequentially addressed for all operations, and thus the use of instructions with indirect addressing with automatic post incrementing of the address register is very limited or even not applicable. Furthermore, the number of registers required to be implemented within the advanced hardware interface 220 is greatly increased as compared with the basic hardware interface 120 due to the need for separate first input operand registers (OP1) to be provided for each supported operation.

These known hardware interfaces to dedicated arithmetic units illustrated in FIGS. 1 and 2 introduce different performance inefficiencies caused by the use of a specific register to select and trigger arithmetic operations or the non-sequential register layout.

SUMMARY OF THE INVENTION

The present invention provides a hardware interface component, a processing system comprising such a hardware interface component and a method of interfacing between an arithmetic unit and an interconnect component of a processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

FIG. 6 illustrates a table representing an example of part of a decorated memory map for a set of arithmetic operations supported by the arithmetic hardware unit of FIG. 4.

DETAILED DESCRIPTION OF THE PREFERRED EMBODIMENTS

Examples of the present invention will now be described with reference to the accompanying drawings. However, it will be appreciated that the present invention is not limited to the specific examples herein described and as illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

In accordance with some examples of a first aspect of the present invention, there is provided a hardware interface component arranged to operably couple at least one arithmetic unit to an interconnect component of a processing system. The hardware interface component comprises a plurality of program-visible registers and at least one operation decoder component. The at least one operation decoder component is arranged to, upon receipt of a write access request via the interconnect component corresponding to a decorated memory-mapped address range for the hardware interface component, decode a register identifier component of a target address of the received write access request based on the decorated memory-mapped address range to identify at least one of the program-visible registers, decode a decoration component of the target address of the received write access request based on the decorated memory-mapped address range to identify an arithmetic operation to be performed, and configure the arithmetic unit to perform the identified arithmetic operation on at least one input operand within the identified at least one program-visible register.

Advantageously, and as described in greater detail below, by implementing such a decorated memory-mapped address range for the hardware interface component, a separate access to a control register to select and trigger the arithmetic operation is not required, whilst still enabling the register mappings of the hardware interface to be sequentially addressed for all operations, thereby enabling the use of load and store multiple instructions with indirect addressing with automatic post incrementing of the address register. Furthermore, different registers are not required to be provided within the hardware interface component for each operation.

Figure 3:
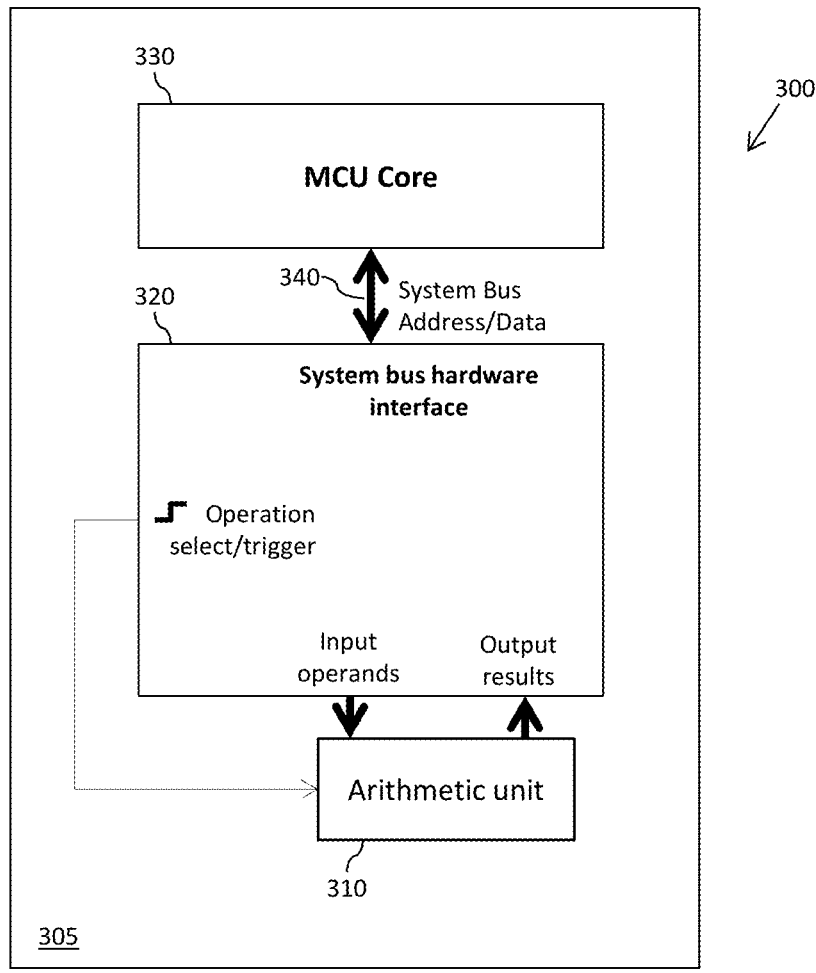
FIG. 3 schematically illustrates a simplified block diagram of a part of a processing system.

Referring now to FIG. 3, there is schematically illustrated a simplified block diagram of a part of a processing system 300, which in the illustrated example is implemented within an integrated circuit device 305 comprising at least one die within a single integrated circuit package. The processing system 300 comprises one or more processor modules, such as the microcontroller unit (MCU) core 330. The processing system 300 further comprises at least one arithmetic hardware unit 310 arranged to provide hardware support for high-dynamic range arithmetic operations such as 64-bit arithmetic operations like divide, square root, multiply and saturated fractional signal processing. The arithmetic hardware unit 310 is operably coupled to a hardware interface component 320 arranged to operably couple the arithmetic unit 310 to a system bus 340 or other interconnect component of the processing system 300. In this manner, the MCU core 330 is able to access arithmetic resources provided by the arithmetic hardware unit 310 via the system bus 340 and hardware interface 320.

Figure 4:
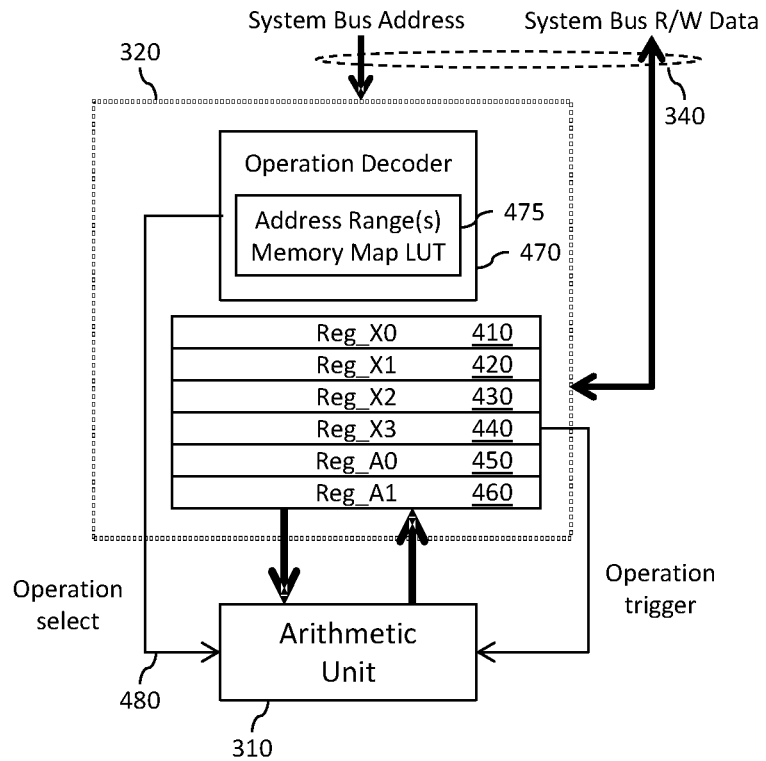
FIG. 4 schematically illustrates a simplified block diagram of an example of a hardware interface component.

FIG. 4 schematically illustrates a simplified block diagram of an example of the hardware interface component 320. The hardware interface component 320 illustrated in FIG. 4 comprises a plurality of program-visible registers: four registers 410 to 440 for passing input operands and two accumulator/result registers 450, 460 for accumulation operations or retrieving the output results from the arithmetic hardware unit 310 in the illustrated example. The hardware interface component 320 further comprises an operation decoder component 470. In the example hereafter described, the operation decoder component comprises one or more decorated memory-mapped address ranges for the set of arithmetic operations supported by the arithmetic hardware unit 310. The decorated memory-mapped address range(s) may be defined within a look-up table (LUT) stored within a memory element 475 accessible to the operation decoder component 470, hardwired within the operation decoder component 470, or defined in any other suitable manner.

A decorated device is a device that implements an address range operation, and applies 'decorations' to operations performed on the address range. A decoration may be specified that provides semantic information about how the operation is to be performed. In the context of examples of the present invention, the hardware interface component 320 may be considered a decorated device, whereby the arithmetic operations supported by the arithmetic hardware unit 310 are memory-mapped, with the mapped address range (or ranges) comprising operation decorations.

Figure 5:
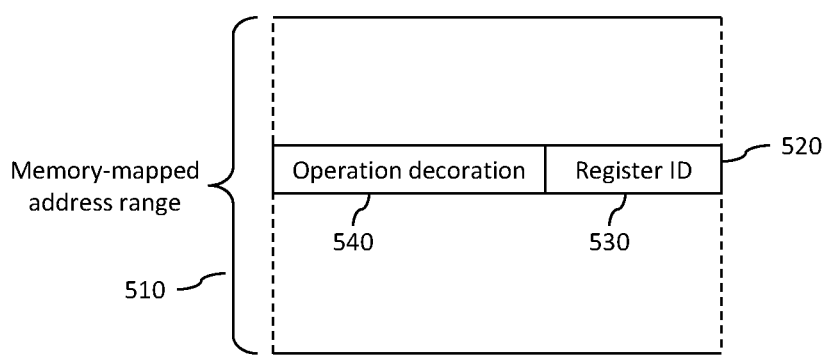
FIG. 5 illustrates an example of a decorated memory-mapped address range.

FIG. 5 illustrates an example of a decorated memory-mapped address range 510. The decorated memory-mapped address range 510 typically covers a plurality of addresses, such as the address 520. In the illustrated example, each address 520 within the decorated memory-mapped address range 510 comprises a register identifier (ID) component 530 identifying a register to be accessed, for example identifying one of the registers 410 to 460 in the example illustrated in FIG. 4. Each address 520 within the decorated memory-mapped address range 510 further comprises at least one decoration component 540, which in the illustrated example comprises an operation decoration. FIG. 6 illustrates a table representing an example of part of a decorated memory map for a set of arithmetic operations supported by the arithmetic hardware unit 310. It should be noted that the table in FIG. 6 uses a 2-digit numeric identifier suffix to denote 64-bit registers. For example, A10 refers to the concatenated {A1,A0} register combination, X32 refers to the concatenated {X3,X2} register combination, etc. Furthermore, since all the registers are 32-bit (4 byte) values, the low-order two byte address bits, address bits [1:0], are always 0 and thus have not been included within the table.

The part of the decorated memory map illustrated in FIG. 6 shows the mapping for 64-bit square root, 32-bit*64-bit multiply and 64-bit/64-bit divide operations. In the example illustrated in FIG. 6, address bits 2 to 4 are used to identify the input operands and accumulator/result registers 410 to 460, whilst address bits 5 to 11 are used to define the arithmetic operation to be performed. In this manner, the input operands and accumulator/result registers 410 to 460 are mapped in the address space for each arithmetic operation.

Additional attributes of the arithmetic operations such as saturation, data limiting and rounding may also be mapped within the decoration component 540. For example, saturation may be enabled, where appropriate, by address bit [11]=1.

In the illustrated example, by mapping the input operands and accumulator/result registers 410 to 460 using lesser significant bits (i.e. bits 2 to 4) within the address, the input operands and accumulator/result registers 410 to 460 may be mapped consecutively for each operation. Furthermore, by ordering the mapping of the registers input operand registers first and in ascending numerical order, i.e. X0, X1, X2, X3, A0, A1, it allows the use of memory load and store multiple instructions using indirect addressing with automatic post incrementing of the address register, enabling the computational throughput of the hardware interface component to be increased.

Referring back to FIG. 4, the operation decoder component 470 is arranged to, upon receipt of a write access request via the system bus 340 corresponding to a decorated memory-mapped address range for the hardware interface component 320, decode the register identifier component 530 of a target address of the received write access request to identify one of the input operand registers 410 to 440, and to load data for the received write access request into the identified input operand register. The operation decoder component 470 is further arranged to decode the decoration component 540 of the target address of the received write access request to identify an arithmetic operation to be performed, and to configure the arithmetic unit to perform the identified arithmetic operation, for example by way of an operation select signal 480.

It is contemplated that the input operand registers 410 to 440 are used in descending order. In this manner, the highest numbered input operand register X3 440 is always used (e.g. if only one 32-bit input operand is required, or is the last input operand register to be loaded if 64-bit or more input operands are required). As such, the loading of data into the input operand register X3 440 may be used as the prompt for triggering the arithmetic unit 310 to perform the configured arithmetic operation. Accordingly, the operation decoder component 470 may be arranged to trigger the arithmetic unit 310 to perform the configured arithmetic operation upon loading data into the last mapped input operand register, i.e. input operand register X3 440 in the illustrated example.

Advantageously, by implementing such a decorated memory map within the hardware interface component 320, no additional accesses are required to be performed for selecting and triggering the arithmetic unit to perform the required arithmetic operation, since the required arithmetic operation may be triggered and executed substantially immediately upon loading of the last input operand into the last mapped input operand register.

Additional characteristics of the hardware interface component 320 illustrated in FIG. 4 include, by way of example:

(i) Write accesses to the input operand registers X0, X1 and X2 410, 420, 430 are never stalled on the system bus 340;
(ii) Write accesses to the last mapped input operand register X3 440 may be stalled if the arithmetic unit 310 is busy with a previous calculation until the arithmetic unit 310 completes the operation and the result becomes available in the accumulator/result registers A0 and A1 450, 460.
(iii) Read accesses to the input operand registers X0, X1, X2 and X3 410, 420, 430, 440 are not stalled on the system bus 340.
(iv) Read accesses to the accumulator/result registers A0 and A1 450, 460 may be stalled until the arithmetic unit 310 completes operation and the accumulator/result registers A0 and A1 450, 460 are updated with new just-computed values.

The hardware interface component 320 as hereinbefore described allows development of simple, short and efficient software wrappers to load operands and retrieve the results from the memory-mapped arithmetic unit 310.

A 64=64/64 divide operation is used as an example of a 64-bit arithmetic operation to be performed by the arithmetic unit 310. The 64=64/64 programming model realized by the hardware interface component 310 illustrated in FIG. 4 comprises the following memory-mapped 'accesses':

| | | |
|---|---|---|
| 1. | ADDR(0x780) ← NUMERATOR_L | // write least-significant 32 bits of numerator to X0 |
| 2. | ADDR(0x784) ← NUMERATOR_H to X1 | // write most-significant 32 bits of numerator |
| 3. | ADDR(0x788) ← DENOMINATOR_L to X2 | // write least-significant 32 bits of denominator |
| 4. | ADDR(0x78C) ←DENOMINATOR_H denominator to X3, | // write most-significant 32 bits of |
| | | // select & trigger 64=64/64 operation |
| 5. | QUOTIENT_L ← ADDR(0x790) from | // read least-significant 32 bits of result quotient // A0 |
| 6. | QUOTIENT_H ← ADDR(0x794) from | // read most-significant 32 bits of result quotient // A1 |

Note that the least-significant 32 bits of a data value is also known as the least-significant word (LSW) and the most-significant 32 bits are also known as the most-significant word (MSW).

Figure 1:
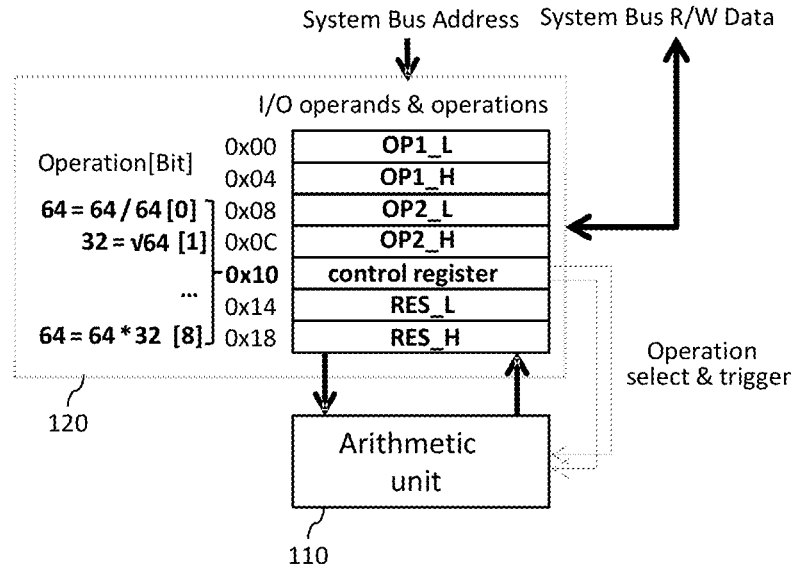
FIG. 1 illustrates a conventional basic hardware interface implementation for a memory-mapped arithmetic hardware unit.
Figure 2:
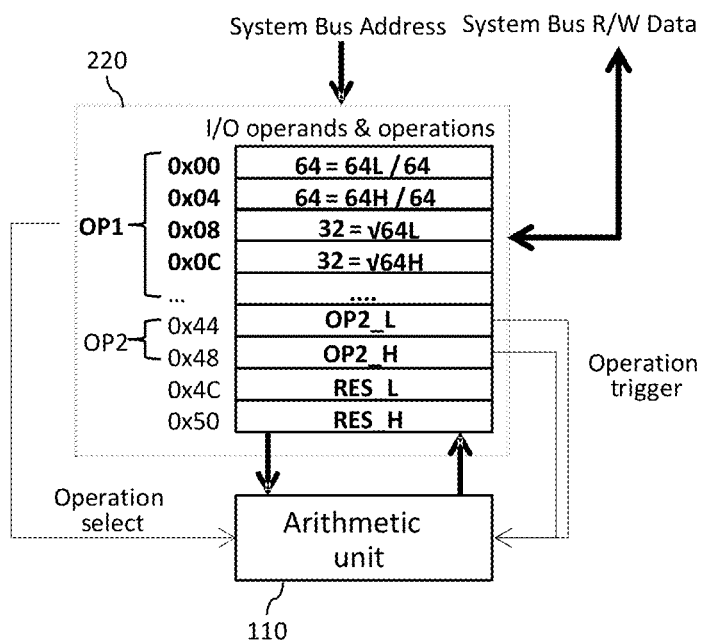
FIG. 2 illustrates a known advanced hardware interface implementation for a memory-mapped arithmetic hardware unit.

The hardware interface component 320 illustrated in FIG. 4 is able to perform more actions with each particular access than the basic hardware interface 120 of the prior art illustrated in FIG. 1 by virtue of the arithmetic operation type to execute being specified in address bits [11:5] of the write accesses to the input operand registers 410 to 440, and the execution of the arithmetic operation being triggered upon completion of the loading of data into the last mapped input operand register (i.e. X3 440 in the illustrated example). In addition, input operand and accumulator/result registers 410 to 460 are mapped continuously in the address space for each mapped arithmetic operation, allowing use of load and store multiple instructions for indirect addressing with automatic post incrementing of the address register.

As will be appreciated by a person skilled in the art, the arithmetic unit 310 may support operations to be performed on the results of previous operations, for example operations to be performed on values stored within the accumulator/result registers 450, 460. Such an operation may be accessed by way of a read access to a memory-mapped target address comprising an operation decoration 540 defining such an operation to be performed on one or more value(s) stored within the accumulator/result registers 450, 460, and a register identifier component 530 corresponding to the accumulator/result register 450, 460 within which the result value to be used as an input operand is stored. For example, upon decoding the register identifier component 530 and operation decoration component 540 of a target address of a received read access request, if the operation decoration component 540 corresponds to an operation to be performed on one or more value(s) stored within an accumulator/result register 450, 460, the operation decoder component 470 may be arranged to configure the arithmetic unit 310 to perform the arithmetic operation identified by the operation decoration component 540 of the target address on a value stored within the identified accumulator/result register 450, 460. Upon receipt of such a read access request, the actual read access may be stalled on the system bus 340 until the respective arithmetic operation has completed and valid result values have been loaded into the accumulator/result registers 450, 460. Once the valid result values have been loaded into the accumulator/result registers 450, 460, the actual read access may be completed by transferring the computed result value within the respective accumulator/result register 450, 460 onto the system bus 340.

In addition to providing access to arithmetic operations supported by the arithmetic unit 310, the hardware interface component 320 is further arranged to make the results of such operations (stored within the accumulator/result registers 450, 460) available, through read accesses of the accumulator/result registers 450, 460. For example, the operation decoder component 470 may be arranged to, upon receipt of a read access request via the system bus 340, decode a target address of the received read access request to identify at least one of the program-visible registers (e.g. one of the accumulator/result registers 450, 460), and to transfer data within the identified program-visible register to the system bus 340. In some examples, the operation decoder component 470 may be arranged to stall system bus operation until valid data is present within the identified program-visible register, and to transfer data from the identified program-visible register to the system bus 340 upon valid data being present within the identified program-visible register.

Figure 7:
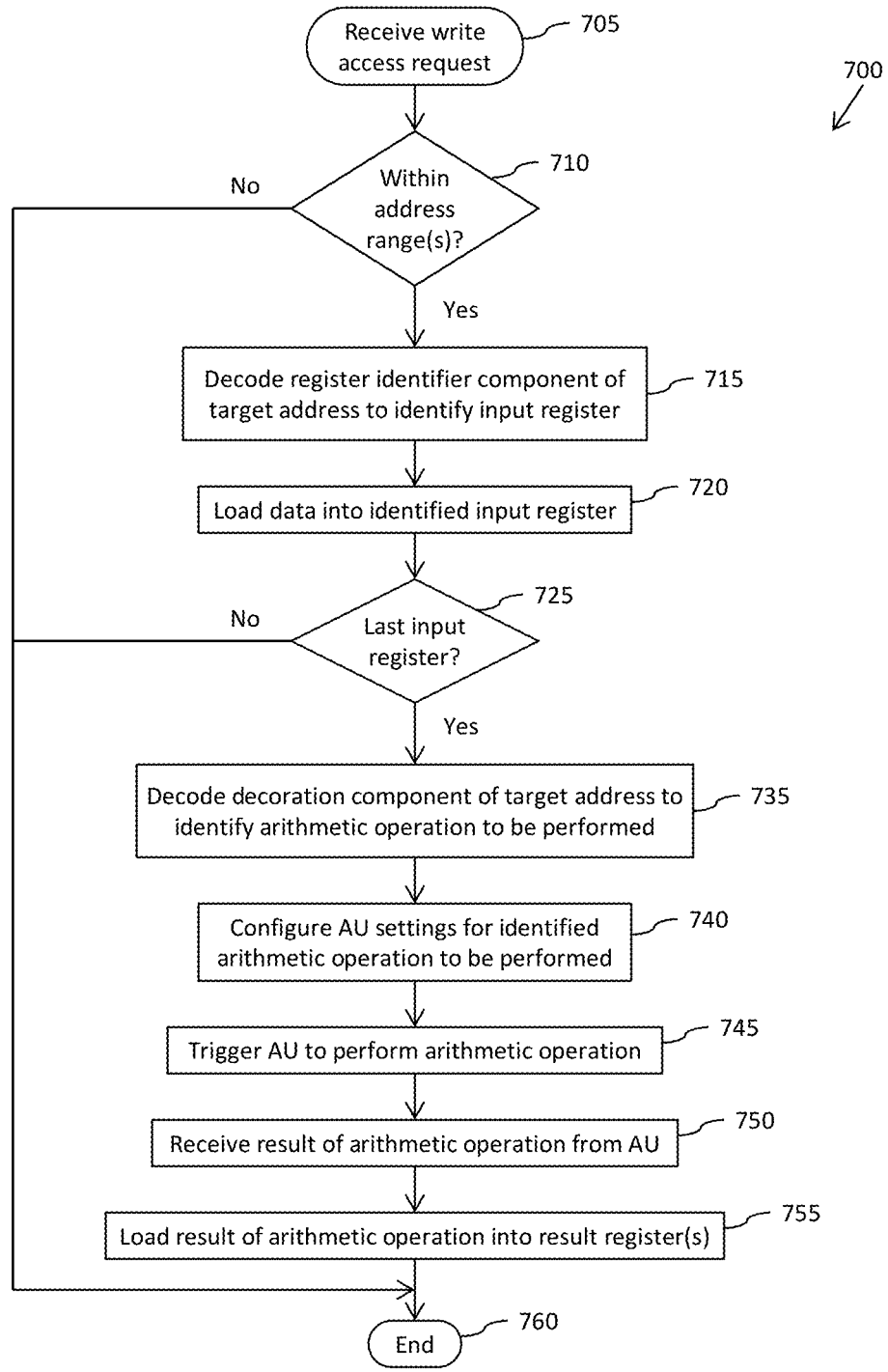
FIGS. 7 and 8 illustrate simplified flowcharts of an example of a method of interfacing between an arithmetic unit and an interconnect component of a processing system.
Figure 8:
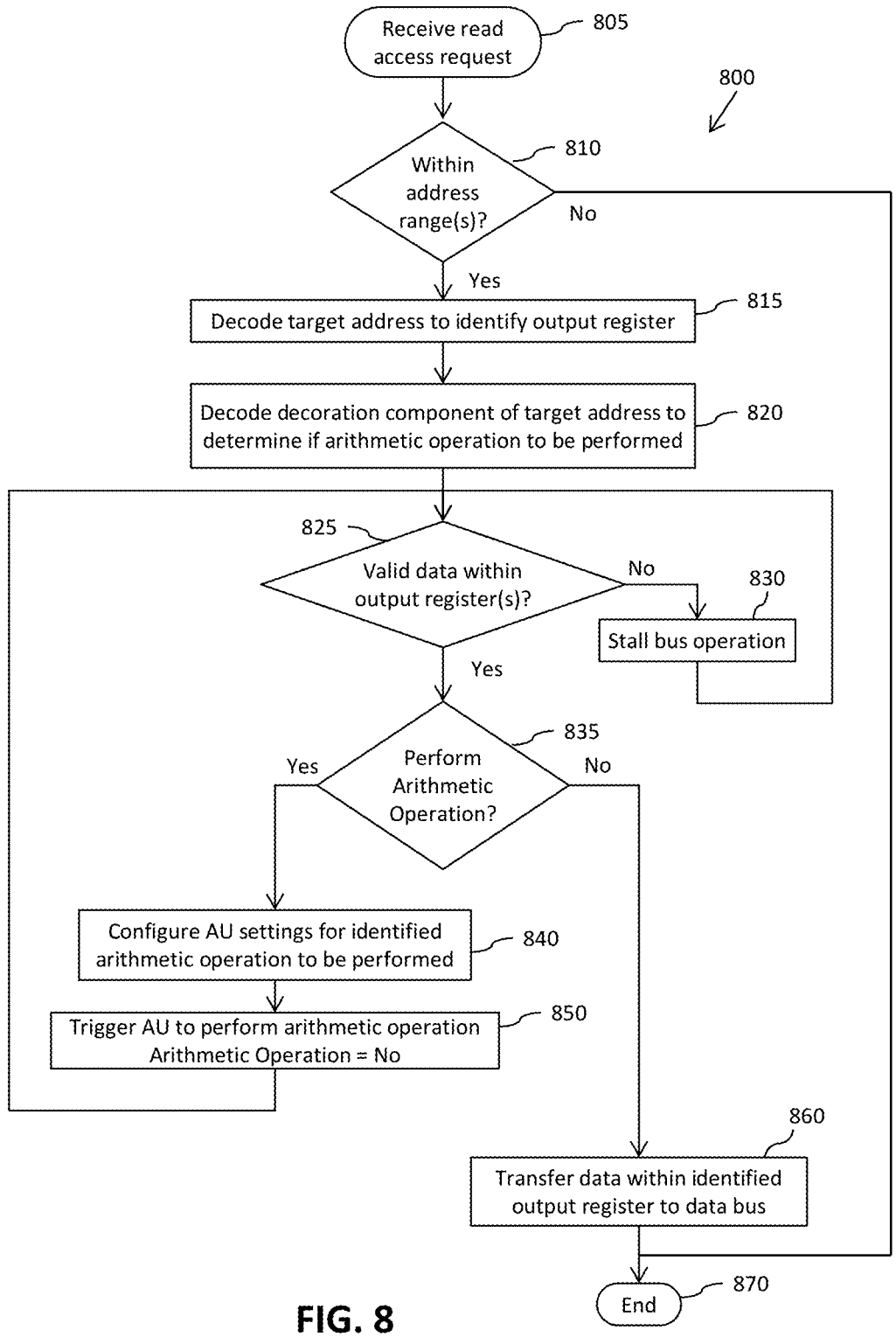

Referring now to FIGS. 7 and 8, there are illustrated simplified flowcharts 700, 800 of an example of a method of interfacing between an arithmetic unit and an interconnect component of a processing system, for example such as may be implemented within the hardware interface component 320 illustrated in FIG. 4.

Referring first to FIG. 7, this part of the method starts at 705 with the receipt of a write access request received via the interconnect component of the processing system. It is then determined, at 710, whether the received write access request comprises a target address within the (or one of the) decorated memory-mapped address range(s) for the hardware interface component. If it is determined that the received write access request does not comprise a target address within the decorated memory-mapped address range(s) for the hardware interface component, the method ends, at 760. However, if it is determined that the received write access request does comprise a target address within the decorated memory-mapped address range(s) for the hardware interface component, the method moves on to 715, where a register identifier component of the target address is decoded to identify a register within the hardware interface component into which the data for the received write access is to be written, for example into which of the input operand registers 410 to 440 the data is to be written in FIG. 4. The data for the received write access is then loaded into the identified register, at 720. In the illustrated example, the method then comprises determining, at 725, whether the identified register within which the data was loaded comprises the last mapped input operand register (e.g. register X3 440 in the example illustrated in FIG. 4). If it is determined that the identified register is not the last mapped input operand register, the method ends, at 760. Conversely, if it is determined that the identified register is the last mapped input operand register, the method moves on to 735, where a decoration component of the target address of the received write access request is decoded to identify an arithmetic operation to be performed. Arithmetic unit (AU) settings are then configured, at 740, to configure the arithmetic unit to perform the identified arithmetic operation on input operands stored within input operand registers of the hardware interface component. The arithmetic unit is then triggered to perform the configured arithmetic operation, at 745. The result of the arithmetic operation is received from the arithmetic unit, at 750, and loaded into one or more result registers, at 755. The method then ends, at 760.

Referring now to FIG. 8, this part of the method starts at 805 with the receipt of a read access request received via the interconnect component of the processing system. It is then determined, at 810, whether the received read access request comprises a target address within the (or one of the) decorated memory-mapped address range(s) for the hardware interface component. If it is determined that the received read access request does not comprise a target address within the decorated memory-mapped address range(s) for the hardware interface component, the method ends, at 870. However, if it is determined that the received read access request does comprise a target address within the decorated memory-mapped address range(s) for the hardware interface component, the method moves on to 815, where a register identifier component of the target address of the received read access request is decoded to identify a register within the hardware interface component from which data is to be read, for example from which of the result registers 450 to 460 the data is to be transferred onto the system bus 340 in FIG. 4. In the illustrated example, a decoration component of the target address of the received read access request is decoded, at 820. It is then determined whether valid data is present within the identified register, at 825. If it is determined that valid data is not present within the identified register, for example based on whether a valid data flag is unset for the identified register, the method stalls bus operation, at 830, until valid data is present within the identified register (e.g. until a valid data flag is set for the identified register). When it is determined that valid data is present within the identified register, the method moves on to 835 where to it is determined whether an arithmetic operation is required to be performed on data within the identified register based on the decoded decoration component of the target address.

If it is determined that an arithmetic operation is not required to be performed on data stored within the identified register, the method jumps to 860 where the data within the identified register is transferred to a data bus component of the system interconnect, and the method ends, at 870. However, if it is determined that an arithmetic operation is required to be performed on data stored within the identified register, at 835, the method moves on to 840 where arithmetic unit (AU) settings are configured to configure the arithmetic unit to perform the required arithmetic operation on the data stored within the identified register of the hardware interface component. The arithmetic unit is then triggered to perform the configured arithmetic operation, at 850. In the illustrated example, the method then loops back to 825.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, in the illustrated examples the hardware interface components have been illustrated and described as separate functional component with respect to the arithmetic units. However it will be appreciated that the hardware interface components and arithmetic units may be implemented as integrated components.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. In a processing system having a processor core, an arithmetic unit, and a hardware interface component coupled between the processor core and the arithmetic unit, a method comprising:

receiving, by the hardware interface component, a write access request from the processor core, wherein the write access request has a corresponding target address and write data, and wherein the target address corresponding to the write access address has lesser significant bits and greater significant bits, in which the lesser and greater significant bits do not overlap;
using a lookup table of the hardware interface component to determine whether the target address corresponding to the write access request is within any one of a plurality of memory-mapped address ranges, wherein the plurality of memory- mapped address ranges are non-overlapping and wherein a different arithmetic operation is mapped to each of the plurality of memory-mapped address ranges;
when the target address corresponding to the write access request is determined to be within a first memory-mapped address range of the plurality of memory-mapped address ranges:
using the lesser significant bits of the target address corresponding to the write access request to identify a first input register, wherein the first memory-mapped address range includes the first input register and a result register,
loading the write data into the first input register, wherein the write data is characterized as operand data,
identifying, using the greater significant bits of the target address corresponding to the write access request, a first arithmetic operation to be performed by the arithmetic unit, wherein the first arithmetic operation is mapped to the first memory-mapped address range, and
performing the first arithmetic operation by the arithmetic unit using the operand data in the first input register and loading a result of the first arithmetic operation into the result register.

2. The method of claim 1, wherein the first arithmetic operation requires N input registers for operand data, in which N is an integer greater than or equal to 1, and the first input register is one of the N input registers, the method further comprising:
storing operand data into the N input registers, except the first input register, prior to receiving the write access request, wherein the first input register is a final input register of the N input registers needing operand data for the first arithmetic operation.

3. The method of claim 2, wherein the arithmetic unit is triggered to perform the first arithmetic operation after the write data is loaded into the first input register.

4. The method of claim 1, further comprising:
receiving, by the hardware interface component, a read access request from the processor core, wherein the read access request has a corresponding target address, and wherein the target address corresponding to the read access request has lesser significant bits and greater significant bits in which the lesser and greater significant bits of the target address corresponding to the read access request do not overlap;
using the lesser significant bits of the target address corresponding to the read access request to identify an output register, wherein the identified output register is the result register;
using the greater significant bits of the target address corresponding to the read access request to determine if a second arithmetic operation is to be performed; and
when the second arithmetic operation is to be performed, upon valid data being available in the output register, performing the second arithmetic operation on the valid data stored in the output register, wherein the second arithmetic operation is identified by the greater significant bits of the target address corresponding to the read access request.

5. The method of claim 4, wherein after determining if the second arithmetic operation is to be performed, stalling a bus operation until valid data is available in the output register.

6. The method of claim 5, further comprising:
after performing the second arithmetic operation, stalling the bus operation until valid data is again available in the output register, and transferring the valid data to a data bus.

7. The method of claim 4, wherein after receiving the read access request, using the lookup table of the hardware interface component to determine that the target address corresponding to the read access request is within one of the plurality of memory-mapped address ranges.

8. The method of claim 4, further comprising:
when the second arithmetic operation is not to be performed, upon valid data being available in the output register, transferring the valid data to a data bus.

9. A processing system, comprising:
a processor core configured to provide a write access request, wherein the write access request has a corresponding target address and write data, and wherein the target address corresponding to the write access address has lesser significant bits and greater significant bits, in which the lesser and greater significant bits do not overlap;
an arithmetic unit; and
a hardware interface component coupled between the processor core and the arithmetic unit and having a lookup table, the hardware interface component configured to:
receive the write access request from the processor core;
use the lookup table of the hardware interface component to determine whether the target address corresponding to the write access request is within any one of a plurality of memory-mapped address ranges, wherein the plurality of memory-mapped address ranges are non-overlapping and wherein a different arithmetic operation is mapped to each of the plurality of memory-mapped address ranges;
when the target address corresponding to the write access request is determined to be within a first memory-mapped address range of the plurality of memory-mapped address ranges:
use the lesser significant bits of the target address corresponding to the write access request to identify a first input register, wherein the first memory-mapped address range includes the first input register and a result register,
load the write data into the first input register, wherein the write data is characterized as operand data,
identify, using the greater significant bits of the target address corresponding to the write access request, a first arithmetic operation to be performed by the arithmetic unit, wherein the first arithmetic operation is mapped to the first memory-mapped address range, and
wherein the arithmetic unit is configured to perform the first arithmetic operation using the operand data in the first input register and loading a result of the first arithmetic operation into the result register.

10. The processing system of claim 9, wherein the first arithmetic operation requires N input registers for operand data, in which N is an integer greater than or equal to 1, and the first input register is one of the N input registers, and the hardware interface component is further configured to:

store operand data into the N input registers, except the first input register, prior to receiving the write access request, wherein the first input register is a final input register of the N input registers needing operand data for the first arithmetic operation.

11. The processing system of claim 10, wherein the arithmetic unit is triggered to perform the first arithmetic operation after the write data is loaded into the first input register.

12. The processing system of claim 9, wherein the hardware interface component is configured to:

receive a read access request from the processor core, wherein the read access request has a corresponding target address, and wherein the target address corresponding to the read access request has lesser significant bits and greater significant bits in which the lesser and greater significant bits of the target address corresponding to the read access request do not overlap;

use the lesser significant bits of the target address corresponding to the read access request to identify an output register, wherein the identified output register is the result register;

use the greater significant bits of the target address corresponding to the read access request to determine if a second arithmetic operation is to be performed; and wherein:

the arithmetic unit is configured to, when the second arithmetic operation is to be performed and upon valid data being available in the output register, perform the second arithmetic operation on the valid data stored in the output register, wherein the second arithmetic operation is identified by the greater significant bits of the target address corresponding to the read access request.

13. The processing system of claim 12, wherein after determining if the second arithmetic operation is to be performed, a bus operation is stalled until valid data is available in the output register.

14. The processing system of claim 13, wherein after performing the second arithmetic operation, the bus operation is stalled until valid data is again available in the output register, and transferring the valid data to a data bus.

15. The processing system of claim 12, wherein the hardware interface component has a lookup table and is configured to, after receiving the read access request, use the lookup table to determine that the target address corresponding to the read access request is within one of the plurality of memory-mapped address ranges.

16. The processing system of claim 12, the hardware interface component is further configured to:

when the second arithmetic operation is not to be performed, upon valid data being available in the output register, transfer the valid data to a data bus.

\* \* \* \* \*